Dec. 22, 1942.  A. B. SONNEBORN  2,305,591
CONTROLS FOR ELECTRIC WELDING APPARATUS
Filed Oct. 26, 1938  2 Sheets-Sheet 2
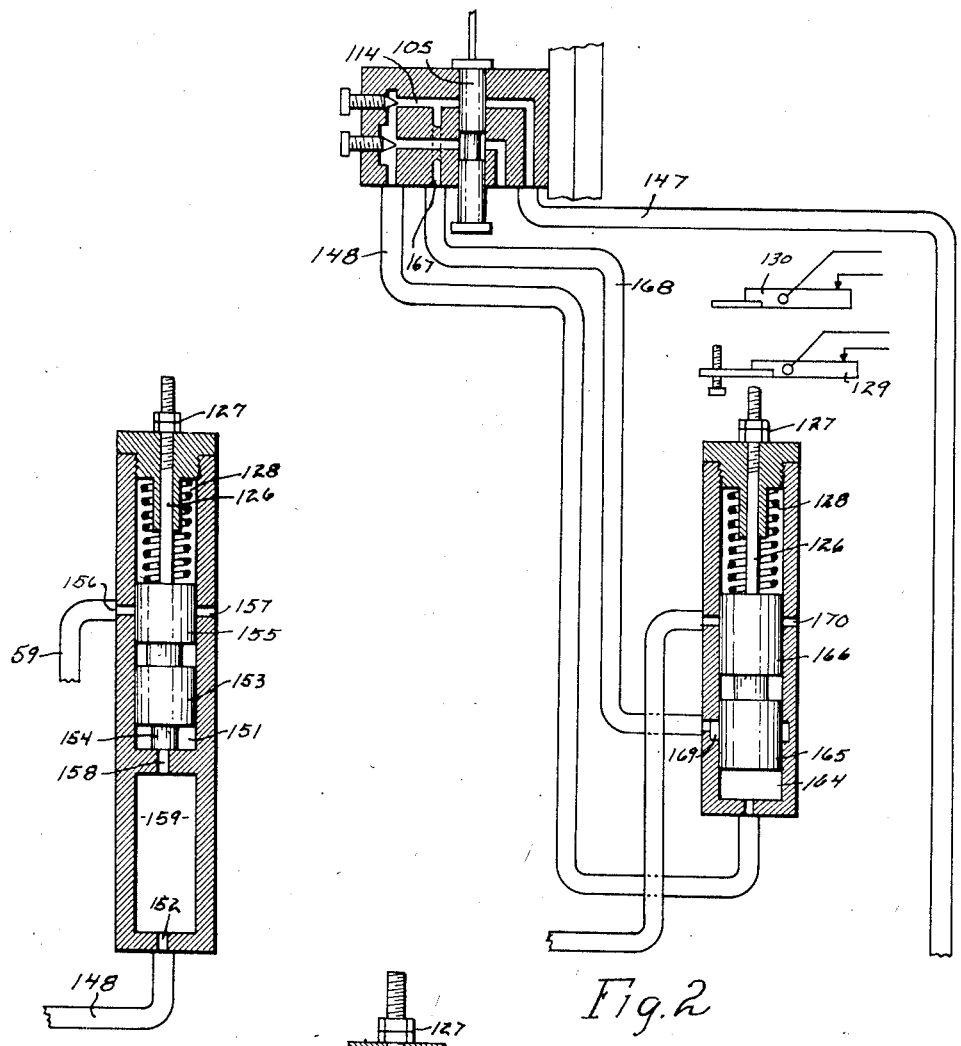
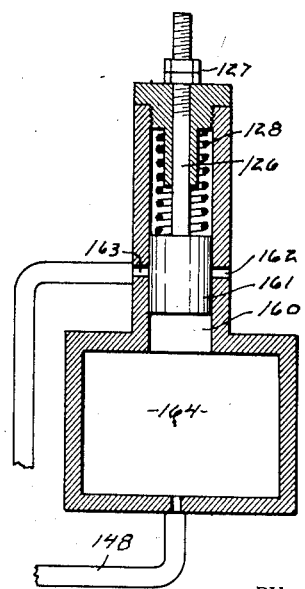
INVENTOR.
Arthur B. Sonneborn
BY Harry R. Canfield
ATTORNEY.

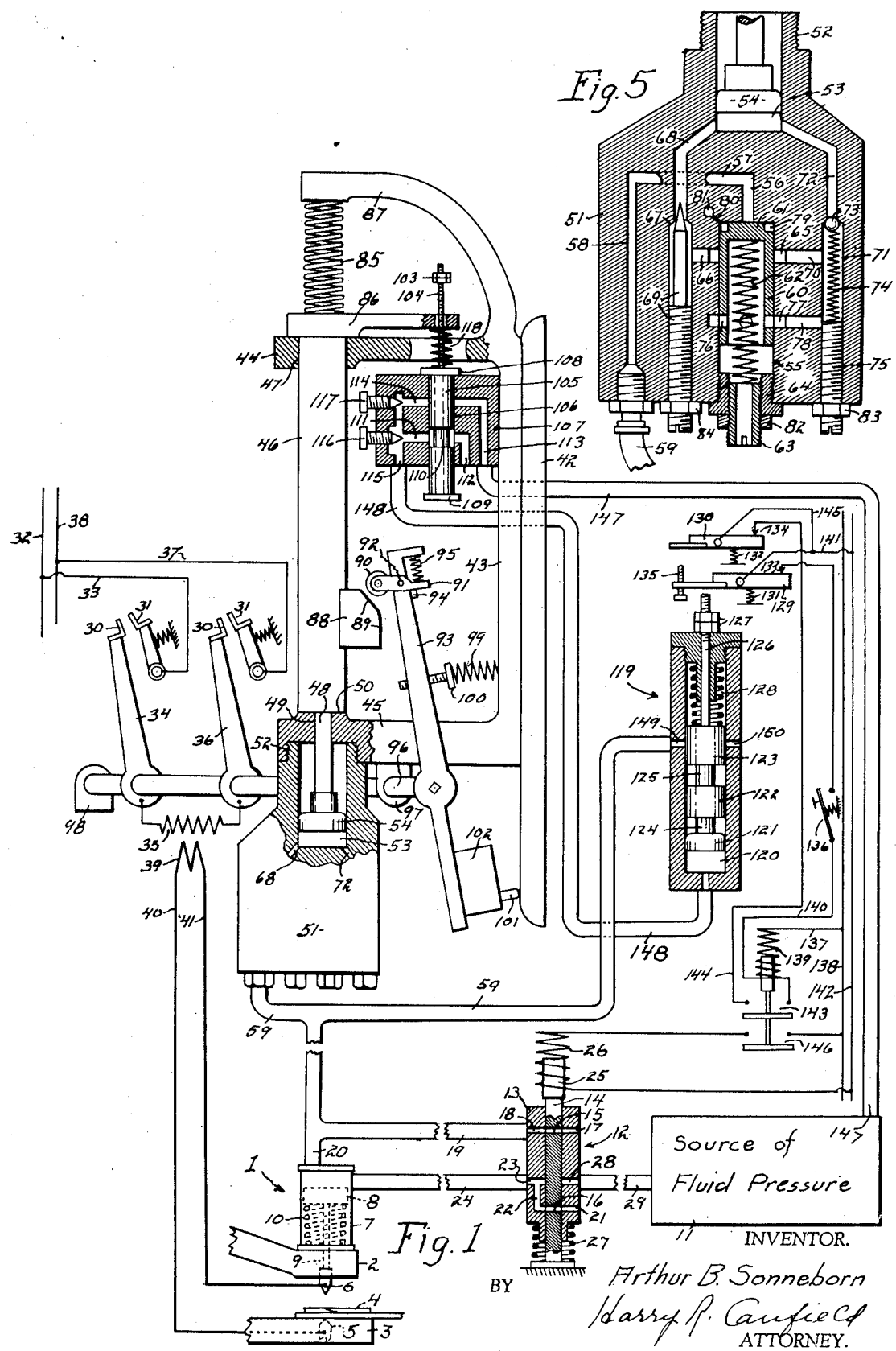

Patented Dec. 22, 1942

2,305,591

UNITED STATES PATENT OFFICE 2,305,591

CONTROLS FOR ELECTRIC WELDING APPARATUS

Arthur B. Sonneborn, Detroit, Mich., assignor to The Clark Controller Company, Cleveland, Ohio, a corporation of Ohio Application October 26, 1938, Serial No. 237,030

14 Claims. (Cl. 219—4)

This invention relates to electric welding apparatus and to controls therefor.

In welding apparatus of the type comprising a welding machine having electrodes which are engaged by pressure with work to be welded, and through which electrodes and work, timed electric welding current is passed to effect a weld at the work, it has been found desirable in many cases for the electrodes to be held in pressure-engagement with the work after the interruption of the electric welding current, for a period of time which has been referred to as a cold-hold time period.

It is to this type of welding apparatus and particularly to the means for effecting the said cold-hold time period that this invention more particularly relates.

It is therefore among the objects of the invention:

To provide generally an improved welding apparatus and control;

To provide generally an improved means for holding the electrodes of the welding machine in pressure-engagement with the work for a time period after the interruption of the welding current, in other words, for a cold-hold time period;

To provide improved means for timing the frequency at which successive welds may be made, or, for timing a predetermined delay between successive welds;

To provide an improved construction of delayed operation timing device;

To provide an improved construction of delayed operation pneumatic valve device;

To provide improved means by which the time period during which the welding machine electrodes remain engaged with the work after the welding current ceases to flow, and the time period of delay, or frequency between successive welds, may be adjusted, one independently of the other;

To provide improved means for insuring that the electrodes of the welding machine will have been released from the work and again engaged with the work before a succeeding impulse of welding current occurs.

Other objects will be apparent to those skilled in the art to which my invention appertains.

My invention is fully disclosed in the following description taken in connection with the accompanying drawings in which;

Fig. 1 is a diagrammatic view illustrating an embodiment of my invention;

Figs. 2, 3 and 4 are fragmentary views similar to a part of Fig. 1 illustrating modifications of a cold-hold delayed operation or time interval device of that figure;

Fig. 5 is a longitudinal sectional view to enlarged scale of parts shown partly in section and partly in elevation in Fig. 1.

Referring to Fig. 1 of the drawings, I have shown generally at 1 a welding machine of the type comprising stationary upper and lower heads 2 and 3, the lower head being arranged to support work 4 to be welded. A lower or stationary electrode is associated with the lower head 3 and a reciprocable electrode 6 with the upper head 2. A pneumatic cylinder 7 is supported on the upper head 2 and has reciprocable therein a piston 8 connected by a piston rod 9 with the electrode 6, the piston being arranged to be reciprocated downwardly by fluid pressure, such as compressed air, in the cylinder 7 above the piston and to be restored upwardly by a spring 10 in the cylinder.

Fluid pressure is supplied to the cylinder 7 from a source of fluid pressure 11, which source may be considered as comprising a storage tank in which fluid, such as air, is stored under pressure by any suitable pressure supplying means.

Illustrated generally at 12 is a magnetic valve comprising an outer stationary cylindrical portion 13 and a valve element 14 reciprocable in a suitable bore therein, the valve element 14 having transverse ducts 15 and 16, the duct 15 in the normal position of the valve illustrated being aligned with an exhaust duct 17 and a duct 18, the latter communicating with a conduit 19 connected to a conduit 20 communicating with the cylinder 7 above the piston 8 whereby to exhaust the same and the conduit 20.

The duct 16 of the valve element is normally aligned with an exhaust duct 21 and a duct 22 communicating with a duct 23 which in turn communicates with a conduit 24 connected to the cylinder 7 and also exhausting the cylinder 7.

In this connection it may be stated that the conduit 20 leading to parts to be described may be of considerable length and that to insure quick operation of the parts of the system, as will be more clearly understood hereafter, both exhausts at 17 and 21 are desirable.

The valve element 14 is arranged to be moved upwardly by a magnetic plunger 25, and an electro-magnetic winding 26 associated with it, against the tension of a spring 27 and thereupon the duct 15 is moved out of alignment with the duct 17 and closes the exhaust thereat, and the duct 16 is moved upwardly to align the duct 23 with a duct 28. Fluid pressure from the source 11 then flows by a conduit 29 through the ducts 28, 16, 23 to the conduit 24 and thence to the cylinder 7 to operate the electrode 6 as described.

After the electrodes have thus been engaged with the work, a pair of electric contacts 30—30 are moved by means to be described into engagement with a corresponding pair of contacts 31—31 and electric current flows from a current supply main 32, by a wire 33 to one of the contacts 31, thence through the contact 30 and a contactor arm 34 through the primary 35 of a transformer, back by another contactor arm 36 to the other contact 30 and thence to the other contact 31, and back by a wire 37 to the other supply main 38.

Current in the secondary 39, of the transformer, is conducted by wires 40 and 41 to the electrodes 5 and 6 respectively to effect a weld at the work 4.

The means for operating the contacts 30 and 31 will now be described.

At 42 is a panel upon which is mounted a frame 43 having lateral arms or brackets 44 and 45. A plunger 46 reciprocates in a bore 47 in the bracket 44 and at its lower end has a reduced diameter portion 48 functioning as a piston rod reciprocating in a bore 49 in the bracket 45, the reduction of diameter providing a down stop 50 for the plunger 46 upon the lower bracket 45.

A valve housing 51 is secured to the bracket 45, preferably by screw threads 52 on the housing threaded into corresponding threads on the bracket. The valve housing 51 is provided with a cylinder 53 within which reciprocates a piston 54 connected to the said piston rod 48.

The arrangement of the parts within the valve housing 51 will now be briefly described with reference to Figs. 1 and 5, this arrangement being more fully illustrated and described in the co-pending application of Charles H. Rippl, Serial Number 120,362, filed January 13, 1937, for improvements in Pressure controls for pneumatically operated switches, now Patent No. 2,172,261, dated September 5, 1939.

Within the housing 51 is a valve bore or cylinder 55, with the upper end of which communicates a duct 56, connected by a cross duct 57 and by a duct 58 with a fluid pressure supply conduit 59, which in turn is connected to the said conduit 20.

A trunk type piston valve 60 reciprocating in the cylinder 55, is of reduced diameter at 61 at its upper end and this end is normally held in sealing engagement with the open end of the duct 50, by a spring 62 in the valve abutting at opposite ends upon the upper closed end of the valve and upon a tubular screw 63 adjustably threaded into a thimble 64 which in turn is threaded into the lower end of the bore 55.

When fluid pressure communicated to the duct 56, as will be described, is of sufficient value, it forces the valve 60 down against the tension of the spring 62. As soon as the end of the duct 61 is uncovered, the full area of the valve is exposed to the pressure and the valve moves with a positive quick action to a lower position in which its upper end uncovers an annular chamber 65 in the cylinder wall.

The chamber 65 communicates by a duct 66 with a bore 67 the upper end of which is reduced to form a valve seat 67 continuing into a duct 68 opening into the cylinder 53.

A needle valve 69 threaded into and sealing the bore 67 adjustably controls flow to the duct 68.

The chamber 65 also communicates by a duct 70 with a bore 71 opening at its upper end into a reduced diameter exhaust duct 72 opening into the cylinder 53. A ball check valve 73 closes the duct 72 being held in closing position by a spring 74 abutting at opposite ends on the ball valve and on an adjusting screw 75 threaded into the bore 71.

The skirt wall of the valve 60 has one or more ports 76 therein, which, with the valve in its normal upper position are aligned with an annular chamber 77 in the wall of the cylinder 55; and the chamber 77 communicates by a duct 78 with the bore 71, the upper end of the screw 75 adjustably overlapping the entrance to the duct 78.

To avoid premature operation of the valve 60 by leakage around the upper end of the valve, into the space at 79 provided by the reduced diameter of the end 61, a bleeder duct 80 exhausting to atmosphere at 81 is provided.

The screws 63, 75 and 69 are all adjustable and can be locked in adjustment by nuts respectively.

In operation of the parts in the housing 51, when pressure in the conduit 59, which is a rising pressure supplied by the conduit 20 as will presently appear, attains a predetermined value for which the spring 62 in the valve 60 is adjusted, this pressure in the duct 56 moves the valve down, thereby communicating the pressure to the duct 66 and, past the needle valve 69 to the duct 68 and cylinder 53 which moves the piston 54 and plunger 46 upward. Pressure is also communicated to the under side of the ball check valve 73 by the duct 70 to keep the duct 72 closed. When pressure in the conduit 59 and duct 56 is relieved, relieving the pressure in the cylinder 53, the valve 60 resets to its upper position and the fluid from the cylinder 53 flows or exhausts out through the conduit 72 displacing the valve 73, into the bore 71, duct 78, ports 76 into the valve and out through the screw 63.

The rate of upward movement of the plunger 46 is adjusted by the needle valve 69, and the rate of return by the screw 75. The return movement of the plunger is effected by a spring 85 aided by gravity, the spring abutting at opposite ends on a bar 86 on the upper end of the plunger and on an arm 87 on the frame 43.

The plunger carries a cam 88 having a cam surface 89. A roller 90 in the nature of a cam follower is mounted on a finger 91 pivoted, as at 92, to an arm 93, the finger being constrained to rotate clock-wise against a stop 94 by a spring 95. The arm 93 is mounted on a shaft 96 supported at one end in a bearing 97 on the bracket 45 and at the other end in another bearing 98 supported in any suitable manner.

By this means, when the plunger 46 is reciprocated upwardly, the cam surface 89 engages the roller 91 causing it to roll over the cam face and thereby rock the arm 93 clockwise, which in turn rocks the contactor arms 34 and 36 clockwise to engage the contacts 30 and 31. Continued movement of the cam 88 causes it to leave the roller 90 and thereupon the arm 93 is rocked in the counter-clockwise direction by a spring 99 abutting at one end upon the frame 43 and at the other end upon a threadedly adjustable stop 100 on the arm, the counter-clockwise position of the arm being determined by a stop 101 engaging the panel 42.

As will now be clear, as the plunger 46 moves upwardly the contacts 30 and 31 will first be closed and then as it moves farther will open again, the time interval during which they remain closed being determined by the velocity of the plunger 46, which is adjustable by adjusting the rate of admission of air to the cylinder 53 through the duct 68, by the screw valve 69.

When air is exhausted from the cylinder 53 and the plunger 46 moves downwardly as described, the cam 88 engages the roller 90 and rocks it around the pivot 92 compressing the spring 95 until after the cam has passed beyond the roller whereupon it snaps back to the position illustrated, so that on the downward movement of the plunger 46 the arm 93 is not rocked but remains inert.

For slow movements of the plunger 46 and relatively long impulses of welding current, the roller 90 remains in contact with the cam surface 89. At greater velocities, for shorter time intervals of current, the roller 90 will be kicked away from the cam face due to the inertia of the parts, and this kinetic energy may be determined by a weight 102 on the arm 93 below the shaft 96, the inertia of the weight tending to hold the arm in the clockwise direction and the spring 99 tending to rotate it.

This part of the subject matter of this case is more fully set forth in the co-pending application of Edward G. Beiderman, Serial Number 84,981, filed June 13, 1936, for improvements in Time controlled electric switches, now Patent No. 2,196,488, dated April 9, 1940.

The said bar 86 upon the upper end of the plunger 46, when the plunger moves up, engages a stop 103 preferably in the form of a pair of lock nuts, on a stem 104 of a valve 105, reciprocating in a bore 106 in a block 107 mounted on the frame 43.

The positions of the valve are determined by flanges 108 and 109 repectively on the upper and lower ends of the valve engageable with the upper and lower sides of the block 107.

The valve is provided with a reduced diameter neck 110 which in the lower position of the valve illustrated is aligned with a duct 111 and an exhaust duct 112, and which, when in the upper position of the valve is aligned with a duct 113 and a duct 114. A duct 115 communicates with the ducts 111 and 114. Needle valve screws 116 and 117 are provided controlling the effective size of the ducts 111 and 114 respectively. The valve 105 is moved downwardly when the plunger 46 returns by a spring 118 disposed around the stem 104 and between the bar 86 and the flange 108 of the valve.

Illustrated generally at 119 is a delayed operation device comprising a cylinder 120 in which reciprocates a piston 121 connected to piston valve portions 122 and 123 spaced from the piston 121 and from each other by reduced diameter necks 124 and 125.

A stem 126 projecting upwardly from the valve portion 123 carries a stop 127 preferably in the form of lock nuts threaded on the stem 126 by which the position of the parts in the cylinder 120 may be longitudinally adjusted.

A spring 128 normally holds the piston downwardly to its stopped position.

Above the device 119 is a pair of pivoted auxiliary contact arms 129 and 130 normally engaged by springs 131 and 132 with contacts 133 and 134 and arranged to be rocked to disengage the contacts by upward movement of the stem 126, in succession, the upper end of the stem being adjacent to the arm 129 and rocking it after a short preliminary movement of the stem, and the arm 129 carrying an adjustable screw 135 movable subsequently into engagement with the arm 130 to rock it.

Description of parts not hitherto given will now be given in connection with a description of the apparatus as a whole.

To effect a welding operation, an operator closes a normally open operator's contactor 136. If a single welding operation is performed, he momentarily closes the contactor, and if a succession of welding operations is to be made he holds it closed. When the operator closes the contactor 136, current flows from a current supply line 138 by a wire 137 through the winding 139 of a relay or electro-magnetic contactor, thence by a wire 140 through the contactor 136 to the contact 133 through the arm 129 and by a wire 141 to the other supply main 142. The relay thus operated makes a maintaining circuit for itself by closing contacts at 143 whereby current flowing through the winding 139 may flow through the contacts at 143 and by a wire 144 to the contact 134 through the arm 130 and by a wire 145 directly to the said other supply main 142, thereby holding the relay closed, although the operator may have released the contactor 136.

It will be observed from the foregoing connections that the closing circuit for the relay is on the contact 133 and the maintaining circuit therefor is on the contact 134.

Operation of the relay also closed contacts at 146 whereupon current flowed from the supply main 138 through the contacts at 146 through the winding 26 of the magnetic valve 12 and back to the other supply main 142, thereby operating the valve in the manner described by raising the valve element 14. This, as described, supplies fluid pressure from the source 11 to the cylinder 7 of the welding machine causing the electrode 6 to be moved downwardly to engage the work 4 between the electrodes 6 and 5.

As is well known, fluid pressure thus supplied from the cylinder 7 expands therein so that the pressure in the conduit 20 which communicates with the cylinder will be a gradually rising pressure, and it will only be after the electrodes 5 and 6 have been fully engaged by pressure with the work and the pressure has risen to a value at which a suitable weld may be made, that the pressure in the conduit 20 communicating with the conduit 59 will have risen to the value at which the fluid will be admitted through the duct 68 to the cylinder 53. When, however, the pressure has thus risen the pressure in the cylinder 53 will move the plunger 46 upwardly and operate the arm 93 and the contactor arms 34 and 36 to send a welding current impulse to the electrodes 5 and 6, as described above.

The plunger 46 when it moves upwardly moves the valve 105 upwardly as described until the neck 110 is aligned with the ducts 113 and 114. Thereupon fluid pressure from the source 11 flows by a conduit 147 to the duct 113, around the neck 110 of the valve in its upper position to the duct 114, passing the needle valve 117, through the duct 115 into a conduit 148 and thence to the cylinder 120 below the piston 121.

The rate of flow of this fluid pressure is controlled by the adjustment of the needle valve 117, and the fluid pressure moves the piston 121 upwardly carrying with it the piston valve portion 123. In the normal position of this piston portion it covers and closes a pair of aligned ducts 149 and 150, the duct 150 being an exhaust duct communicating with atmosphere and the duct 149 being connected to the conduit 59.

When the piston valve portion 123 therefore is moved upwardly sufficiently far, and after a time interval, it uncovers the ports 149 and 150 and opens an exhaust to atmosphere for the cylinder 53, through the conduit 59, the exhaust air flowing around the valve neck 125.

When the piston 121 started to move upwardly and after a short initial movement, it rocked the switch arm 129 to disengage the contact 133, whereby even if the operator's contactor 136 had been maintained closed for a repeat operation, the relay winding 139 would be energized through the maintaining contacts 134. As the piston 121 moves upwardly and reaches the point in its stroke at which exhaust occurs at the duct 150, the screw 135 engages the arm 130 and rocks it out of engagement with contact 134, de-energizing the relay winding 139 and opening the contacts at 146, allowing the magnetic valve 12 to reset and exhaust the cylinder 7 at the duct 21, as described above, restoring the electrodes 5 and 6 out of engagement with the work. The exhaust effected at the duct 150 by the piston 121 relieves the pressure holding the valve 60 down (Fig. 5) and the valve reseats, opening the exhaust for the cylinder 53 through the duct 78, which allows the plunger 46 to immediately return. The plunger restores downwardly the valve 105 and aligns the duct 112 with the ducts 111 and 115, and cutting off the air supply from the conduit 147 to the cylinder 120.

Pressure in the cylinder 120 having thus been relieved, the spring 128 starts the piston 121 downwardly, exhausting the fluid in the cylinder 120 outwardly through the conduit 148, through the duct 115 past the needle valve 116 into the duct 111 around the neck 110 to the exhaust duct 112, the rate of downward movement of the piston 121 being determined by the adjustment of the needle valve 116.

As the piston moves downwardly it first re-engages the arm 120 with the contact 134 and finally at, or near, the end of its down stroke engages the arm 129 with the contact 133. If at this time, the contactor 136 has been maintained closed, the parts, which are all in their original restored condition, operate to go through another cycle of operations, but if the contactor 136 has been left open, the parts remain at rest.

As will be clear from the foregoing description, the delayed upward movement of the piston 121 of the device 119, which movement is determined by the adjustment of the screw 117, determines the length of the cold-hold period, during which the electrodes 5 and 6 remain engaged with the work after the welding current has been cut off; and that the downward movement of the piston 121, the rate of which is determined by the adjusting screw 116 determines the length of the period which must elapse before another welding operation can be performed, that is to say, the possible frequency of successive operations.

It is desirable, of course, that the exhaust effected by the device 119 at the duct 150 and the opening of the contact 134 will occur substantially simultaneously, and this will be effected with a relatively rapid movement of the piston 121, that is to say, on short cold-holds. For long cold-holds, this can also be accomplished by the device 119 if the parts are carefully adjusted.

When it is not desired to require a close adjustment, the arrangement illustrated in Figs. 2, 3 and 4 may be employed.

Referring to Fig. 3 the delayed operation device illustrated therein is generally similar to that illustrated at 119, in Fig. 1, but is arranged not to operate until an operating pressure has been obtained at which it will quickly, and with a jump action, operate its full stroke. A cylinder 151 is provided to which fluid pressure is admitted by a duct 158. A piston 153 in the cylinder has a reduced diameter portion 154 covering and sealing the duct 158. Connected to the piston is a cylinder valve portion 155, covering and closing aligned ducts 156 and 157, the duct 157 opening to atmosphere. The duct 158 communicates with the above described conduit 59. The stem 126, stop 127 and spring 128 of the form of Fig. 1 are reproduced. Below the duct 158 is a chamber 159 into the lower end of which the said conduit 148 communicates by a duct 152.

In the operation of this form, when the valve 105 of Fig. 1 is operated and the source pressure is adjustably communicated to the conduit 148, this pressure accumulates in the chamber 159 of Fig. 3 while the time interval is running, the rate of accumulation being determined, as will be understood, by the adjusting screw 117, Fig. 1. When sufficient pressure has accumulated in the chamber 159, the pressure on the lower end 154 of the piston 153 in the duct 158 becomes sufficient to overcome the spring 128 and the piston starts to rise and immediately the full area of the lower end of the piston 153 is exposed to the pressure, and it moves its full stroke upwardly with a quick jump action, effecting exhaust at the duct 157 and operating the auxiliary contact arms 129 and 130 as described.

In Fig. 4, is illustrated a similar arrangement having a cylinder 160 and a piston valve 161 therein arranged to move upwardly to open an exhaust duct 162 aligned with a duct 163 which communicates with the conduit 59, the stem 126 and 127 and spring 128 being provided as before.

The cylinder 160 opens downwardly into a large chamber 164 communicating with the conduit 148.

With this form when the valve 105, of Fig. 1, is lifted, and fluid pressure is communicated to the conduit 148, it accumulates in the chamber 164 and when the pressure thereof on the lower end of the piston 161 reaches a value sufficient to overcome the spring 128 and the piston 161 therefore starts to move upwardly, it will continue to move with a relatively rapid motion throughout sufficient stroke to open exhaust at 162 and open the contacts 133 and 134 by the stem 126, as described above, the displacement of space in the cylinder 164 by the moving piston 161 being small relative to the volumetric capacity of the chamber 164.

In both the forms of Figs. 3 and 4, the time interval is obtained by the accumulation of pressure in the chambers 159 and 164 which in turn is determined by the adjustment at the screw 117, of Fig. 1.

In the modification of Fig. 2, a cylinder 164 is provided in which reciprocates a piston 165 and a valve 166, the stem 98, stop 99 and spring 100, of Fig. 1, being reproduced.

The valve 105 and associated parts are substantially the same as shown in Fig. 1, except that an additional duct 167 is provided communicating with the duct 114 and with a conduit 168 leading to an annular chamber 169 surrounding the middle part of the piston 165.

The piston 165 is arranged to uncover the chamber 169 after a predetermined upward movement and subsequently thereto the piston 165 is arranged to uncover an exhaust port 170.

In the operation of this modification, when the valve 105 is operated, as described in connection with the form of Fig. 1, source fluid pressure in the conduit 147 is communicated to the conduit 148 and thence to the cylinder 164 and the piston 165 moves upwardly at a retarded rate determined by the adjustment of the screw 87. After a time interval, the piston 165 begins to uncover the annular chamber 169 and thereupon source fluid pressure flows from the conduit 147 around the valve 105 to the duct 114, thence to the duct 167 and conduit 168 into the chamber 169 and under the piston 165.

This flow of source fluid pressure being unrestricted given an instantaneous upward thrust to the valve 166, causing it to move with a quick jump action and cover the exhaust port 179, at the same time, operating the auxiliary contact arms 129 and 130 for the purposes described.

When the valve 105 has been returned downwardly to the position illustrated, fluid pressure is cut off from the conduit 168 and the downward movement of the piston 165 is determined by the exhaust of fluid through the conduit 148 and past the needle valve 116, as described above.

I claim:

1. In an electro-fluid-pressure system, an apparatus having an electrically energizable circuit and a fluid pressure operable element, electric contactor means comprising a fluid pressure movable element movable to close and after a predetermined time interval of movement to open the energizing circuit, timing means and means associated therewith controlling communication of fluid pressure to the apparatus element, to maintain it operated for a predetermined time interval after opening of the energizing circuit, and means responsive to movement of the contactor element to actuate the timing means.

2. In an electro-fluid-pressure system, an apparatus having an electrically energizable circuit and a fluid pressure movable element, electric contactor means comprising a fluid pressure movable element movable to close and after a predetermined time interval of movement to open the energizing circuit, fluid pressure operable timing means and means associated therewith controlling communication of fluid pressure to the apparatus element to maintain it moved for a predetermined time interval after opening of the energizing circuit, valve means and conduit means controlled thereby operated by movement of the contactor element to admit fluid pressure from the source to the timing means.

3. In an electro-fluid-pressure system, a source of electric current, a source of fluid pressure, an apparatus having an electrically energizable circuit and a fluid pressure movable element, an electrically operable valve and conduit means controlled thereby for communicating source pressure to the apparatus element to move it, electric contactor means comprising a movable element movable to close and after a predetermined time interval of movement to open the energizing circuit, timing means controlling energization of the valve to maintain the apparatus element moved for a predetermined time interval after opening of the energizing circuit and means responsive to movement of the contactor element to actuate the timing means.

4. In an electro-fluid-pressure system, a source of electric current, a source of fluid pressure, an apparatus having an electrically energizable circuit and a fluid pressure movable element, an electrically operated valve and conduit means controlled thereby for communicating source fluid pressure to the apparatus element, electric contactor means comprising a movable element movable to close and after a predetermined time interval of movement to open the energizing circuit, fluid pressure operated timing means controlling energization of the valve to maintain it operated for a predetermined time interval after opening of the energizing circuit, valve means and conduit means controlled thereby operable by movement of the contactor element to admit fluid pressure from the source to the timing means to operate it.

5. In an electro-fluid-pressure system, a source of electric current, a source of fluid pressure, an apparatus having an electrically energizable circuit and a fluid pressure movable element, an electrically operable valve and conduit means controlled thereby for communicating source pressure to the apparatus element, electric contactor means comprising an element movable by fluid pressure to close and after a predetermined time interval to open the energizing circuit, the contactor means comprising a fluid pressure chamber and conduit means for communicating source fluid pressure thereto under control of the electrically operable valve, fluid pressure operable timing means controlling energization of the valve to maintain it operated for a predetermined time interval after opening of the energizing circuit, valve means and conduit means controlled thereby operable by fluid pressure effected movement of the contactor element to admit fluid pressure from the source to the timing means to operate it, and an exhaust from the contactor fluid pressure chamber opened upon operation of the timing means to effect restoring of the contactor element.

6. In an electro-fluid-pressure system, a source of electric current, a source of fluid pressure, an apparatus having an energizable electric circuit and a fluid pressure movable element, electrically actuated means and means associated therewith controlling communication of fluid pressure to the apparatus element to effect movement thereof, electric contactor means comprising a movable element movable to close and after a predetermined time interval of movement to open the energizing circuit, timing means controlling the electrically actuated means to effect restoring of the apparatus element and to prevent a successive movement thereof until after a predetermined time interval, and means responsive to movement of the contactor element to actuate the timing means.

7. The system described in claim 6 and in which the timing means is a fluid pressure operated timing means and a valve and conduit means controlled thereby are provided, the valve being operated responsive to movement of the contactor element to communicate source fluid pressure to the timing means to operate it.

8. In an electro-fluid-pressure system, a source of electric current, a source of fluid pressure, an apparatus having an energizing electric circuit and having a fluid pressure movable element, an electrically operable valve and conduit means controlled thereby for communicating source fluid pressure to the apparatus element to move it, electric contactor means comprising a movable element movable to close and after a predetermined time interval of movement to open the energizing circuit, timing means controlling energization of the valve to effect restoring of the apparatus element and to prevent a successive movement thereof until after a predetermined time interval, and means responsive to movement of the contactor element to actuate the timing means.

9. In an electro-fluid-pressure system, a source of electric current, a source of fluid pressure, an apparatus having an electrically energizable circuit and a fluid pressure movable element, an electrically operable valve and conduit means controlled thereby for communicating source fluid pressure to the apparatus element to move it, electric contactor means comprising a movable element movable to close and after a predetermined time interval of movement to open the energizing circuit, fluid pressure operated timing means controlling energization of the valve to effect restoring of the apparatus element and to prevent a successive movement thereof until after a predetermined time interval, a valve and conduit means controlled thereby operable by movement of the contactor element to communicate fluid pressure from the source to the timing means to operate it.

10. In an electro-fluid-pressure system, a source of electric current, a source of fluid pressure, an apparatus having an electrically energizable circuit and a fluid pressure movable element, electrically actuated fluid pressure means controlling movement of the apparatus element, electric contactor means comprising a movable and restorable element arranged, when moving, to close and then open the energizing circuit, fluid pressure operable means controlling the electrically actuated means and operable to maintain the apparatus element moved for a predetermined time interval after opening of the circuit, and then to effect restoring of the apparatus element, the timing means upon restoring controlling actuation of the electrically actuable means to prevent a successive movement of the apparatus element until after a predetermined time interval, means responsive to movement of the contactor element to operate the timing means and responsive to restoring of the contactor element to restore the timing means.

11. The system described in claim 10 and in which a valve and conduit means controlled thereby is provided and the contactor element upon moving effects operation of the valve to admit fluid pressure through the conduit means to the timing means to operate it, and the contactor element upon restoring effects restoring of the valve to cut off communication of the source pressure from the timing means and to exhaust the timing means to effect restoring thereof.

12. In an electro-fluid-pressure system, a source of electric current, a source of fluid pressure, an apparatus having an electrically energizable circuit and having a fluid pressure movable element, an electrically operable valve and conduit means controlled thereby for communicating source fluid pressure to the apparatus element, electric contactor means comprising a fluid pressure movable element movable to close and after a predetermined time interval of movement to open the energizing circuit, timing means controlling energization of the valve to maintain it operated for a predetermined time interval after opening of the energizing circuit, means responsive to movement of the contactor element to actuate the timing means, the timing means upon restoring controlling energization of the electrically operable valve to prevent a successive operation thereof until after a predetermined time interval, and means responsive to the restoring of the contactor element to effect restoring of the timing means.

13. In an electro-fluid-pressure system, a source of electric current, a source of fluid pressure, an apparatus having an electrically energizable circuit and having a fluid pressure movable element, an electrically operable valve and conduit means controlled thereby for communicating source pressure to the apparatus element, electric contactor means comprising a fluid pressure movable element movable to close and after a time interval of movement to open the energizing circuit, fluid pressure operated timing means controlling energization of the valve to maintain it operated for a predetermined time interval after opening of the energizing circuit, valve means and conduit means controlled thereby, the valve means being operated by movement of the contactor element to admit source fluid pressure to the timing means to operate it, the timing means upon restoring controlling energization of the electrically operable valve to prevent a successive operation thereof until after a predetermined time interval, and the said valve means being restored upon restoring of the contactor element to effect restoring of the timing means.

14. In an electro-fluid-pressure system, a source of current, a source of fluid pressure, an apparatus having an electrically energizable circuit and having a fluid pressure movable element, an electrically operable valve and conduit means controlled thereby for communicating source fluid pressure to the apparatus element, contactor means comprising a fluid pressure movable element movable to close and after a predetermined time interval of movement to open the energizing circuit, fluid pressure operable timing means controlling energization of the valve to maintain it operated for a predetermined time interval after the opening of the energizing circuit, the timing means upon restoring controlling energization of the valve to prevent a successive operation thereof until after a predetermined time interval, valve means operated by movement of the contactor element and conduit means controlled thereby to effect communication of source pressure to the timing means to operate it, and the valve means controlling other conduit means and effecting restoring of the timing means upon restoring of the valve means by restoring of the contactor element, and the timing means upon operating effecting exhaust of pressure from the contactor element to effect restoring thereof.

ARTHUR B. SONNEBORN.